3,230,039
PROCESS FOR MANUFACTURING SODIUM
TRIMETAPHOSPHATE PRODUCTS
Joe S. Metcalf, Webster Groves, and Chung Yu Shen, Olivette, Mo., assignors to Monsanto Company, a corporation of Delaware
No Drawing. Filed Jan. 2, 1962, Ser. No. 163,886
3 Claims. (Cl. 23—106)

The present invention relates to novel processes for manufacturing inorganic sodium phosphate products that contain, as their main constituent, sodium trimetaphosphate. More particularly, the present invention relates to improved calcining processes for manufacturing sodium trimetaphosphate products that contain a minimum amount of water-insoluble metaphosphates.

When monosodium orthophosphate and/or sodium acid pyrophosphate are heated (according to a conventional calcining technique for preparing sodium trimetaphosphate) at a temperature above about 450° C. for several hours, the resulting sodium trimetaphosphate product invariably contains an undesirably large amount (e.g. more than about 1 weight percent) of a variety of sodium metaphosphate that is insoluble in water. This "insoluble metaphosphate" is commonly referred to as "IMP." The actual amount of IMP in the sodium trimetaphosphate products manufactured in this manner is dependent to some extent upon the amount of time that the reaction materials are held at temperatures above about 450° C. (the longer the time, the lower the IMP content of the trimetaphosphate product). However, in order to make sodium trimetaphosphate that contains substantially no IMP (i.e. less than about 0.2 weight percent) via conventional processes, the reaction materials have to be held at a temperature of about 450° C. for at least about 48 hours. It is commercially impractical to utilize such long reaction times for the manufacture of sodium trimetaphosphate. Indeed, sodium trimetaphosphate is not available today except in laboratory or pilot plant quantities and only at relatively high prices. Yet, there are presently many areas of application (for example, as a substitute for sodium tripolyphosphate in the manufacture of heat-dried detergents) wherein sodium trimetaphosphate that is essentially free of IMP can be beneficially utilized, provided it can be made at a reasonable cost (i.e. via a commercially practical process).

In accordance with the invention disclosed in U.S. Patent application, Serial No. 163,442, filed concurrently herewith and now abandoned, it is possible to produce sodium trimetaphosphate compositions having satisfactorily low levels of IMP within a reasonable length of time, provided that there is present in the calciner feed streams at least one completely molecularly dehydrated polyphosphate such as, sodium tripolyphosphate, tetrasodiumpyrophosphate, sodium "glassy" phosphate, and sodium trimetaphosphate as an "accelerator." In accordance with the present invention, however, it has been found that any water soluble inorganic sodium phosphate salt can be utilized to prepare sodium trimetaphosphate products having satisfactorily low levels (e.g. less than about 0.5 weight percent) of IMP within a reaonable sojourn time in the calciner, provided that the ratio of $Na_2O/P_2O_5$ in the "raw" material heat stream for the calciner falls within a certain narrow range of values, (i.e., between about 1.03 and about 1.12, and preferably within the range of from about 1.05 to about 1.10). In other words the accelerators mentioned above need not be employed in the practice of the present invention. As a matter of fact this invention can be advantageously practiced when the raw phosphatic materials which are present in the calciner feed streams consist substantially entirely of molecularly hydrated sodium phosphate salts.

In order to attain ratios of $Na_2O/P_2O_5$ within either of these desired ranges, mixtures of sodium phosphate salts must be utilized in the calciner feed streams. In most instances, these mixtures will be made up substantially entirely of inorganic sodium phosphate salts that contain water of constitution (as distinguished from water of hydration), such as, for example, monosodium orthophosphate, disodium orthophosphate, sodium acid pyrophosphate and trisodium dihydrogen tripolyphosphate. These phosphatic materials can be either hydrated or anhydrous, and must be substantially completely soluble in water at a level of about 1 weight percent. While it is generally most convenient to utilize a mixture of only two different phosphate salts (and of these it is preferred that a mixture of monosodium orthophosphate and disodium orthophosphate be utilized), mixtures of more than two can be used. For optimum results, these "raw" phosphate materials should be intimately blended prior to their calcined. In addition, sometimes it is convenient to utilize in lieu of one of these molecularly hydrated phosphate salts, one or more of the "accelerators" described in the aforementioned concurrently filed U.S. patent application.

It should be noted that the present invention can only be utilized for the production of sodium trimetaphosphate products that contain from about 7 to about 22 weight percent of sodium tripolyphosphate. However, for most of the important end uses for which sodium trimetaphosphate is manufactured, the presence of such small amounts of apparently "contaminating" sodium tripolyphosphate in the sodium trimetaphosphate products have been found to be harmless.

The processes of this invention can be carried out in practically any conventional calcining equipment whereby conversion temperatures above about 350° C. can be attained. In order to accomplish the desired conversion (of the mixtures of phosphate salts described heretofore to a mixture of sodium trimetaphosphate plus minor amounts of sodium tripolyphosphate), the phosphate mixtures must be heated to a temperature above about 350° C. and preferably to above about 425° C., but below about 600° C. (which is the maximum melting point of these sodium trimetaphosphate products). Where a small amount of incipient fusion within the calciner is considered objectionable, it is preferred that the temperature of the phosphate mixture during the calcination be maintained below about 550° C.

Generally significantly reduced levels of IMP in the sodium trimetaphosphate products (as compared with similarly treated "raw" phosphate materials having the conventional $Na_2O/P_2O_5$ ratio of 1.0) can be noted after a period of reaction (conversion) of only a few minutes at temperatures above about 350° C. However, in order for most of the phosphate salts in any of the phosphate mixtures that are utilized in the processes of this invention to be converted into sodium trimetaphosphate, generally at least about 15 minutes are required, even at the relatively higher conversion temperatures of above about 500° C. As a general rule, somewhat longer conversion periods must be utilized in order to manufacture a sodium trimetaphosphate product having a given low level of IMP when relatively lower conversion temperatures are used than when relatively higher temperatures are used in these processes. In addition, for a given temperature and $Na_2O/P_2O_5$ ratio within the prescribed limits, longer conversion times generally result in lower IMP levels in the final trimetaphosphate product.

The processes of the present invention can also be included in recycle procedures, provided the amount of calciner feed and the amount of the sodium trimetaphosphate product which is recycled are adjusted and/or controlled so that the $Na_2O/P_2O_5$ ratio of the total mass of phosphate salts that is passed through the calciner at any given time falls within the limits prescribed heretofore. In such recycle processes the sodium tripolyphosphate as well as the sodium trimetaphosphate will perform as the "accelerators" in the aforementioned, concurrently filed U.S. patent application, Serial No. 163,442, and now abandoned.

In the following examples, all parts are by weight unless otherwise specified.

*Example I*

In to a mixture of 1000 parts of 85% $H_3PO_4$ and 800 parts of water are stirred slowly 494 parts of sodium carbonate. The resulting reaction product, a mixture of monosodium orthophosphate and disodium orthophosphate, is dissolved in the water. The $Na_2O/P_2O_5$ ratio in this solution is 1.075. The solution is drum-dried on a conventional steam-heated stainless steel roll to remove most of the free water. Then, over a period of 10 minutes, the resulting drum-dried flakes are heated in a conventional indirectly heated rotary calciner to 500° C. and held at about this temperature for 1 hour. The resulting sodium trimetaphosphate product contains about 13 weight percent of sodium tripolyphosphate and only about 0.04 weight percent of IMP. By comparison, a conventional reaction product of $H_3PO_4$ and $Na_2CO_3$ (monosodium orthophosphate, having an $Na_2O/P_2O_5$ ratio of 1.00) calcined for 1 hour at about 500° C. contains more than 32 times as much IMP.

*Example II*

The data in the following table illustrates the wide applicability with respect to some of the "raw" phosphate materials that can be utilized in the processes of this invention, as well as the substantial improvement in IMP levels (as compared to the conventional calcining processes for manufacturing sodium trimetaphosphate) that can result from practicing the invention.

dium trimetaphosphate products containing less than 1 weight percent IMP in less than 1 hour. It can also be noted that when one utilizes a ratio of 1.075, the sodium trimetaphosphate product produced thereby in only one hour at 500° C., contains significantly less than 0.1 weight percent of IMP. By comparison, it takes more than 20 hours of calcining at 500° C. in order to conventionally produce a sodium trimetaphosphate product containing as little as 0.1 weight percent of IMP. Since as a general rule, relatively short calcining periods require less heat per unit of manufactured product (other factors being equal) than do longer calciner periods, the advantage of utilizing the present invention from the standpoint of processing cost alone can readily be appreciated.

What is claimed is:

1. A process for manufacturing a blend consisting essentially of sodium trimetaphosphate and sodium tripolyphosphate; said mixture containing from about 7 to about 22 weight percent of sodium tripolyphosphate and less than about 0.5 weight percent of water insoluble metaphosphates, which process comprises calcining for at least about 15 minutes at a temperature between about 450° C. and about 600° C. a mixture of monosodium orthophosphate and at least one other water soluble inorganic sodium phosphate salt; said mixture having an $Na_2O/P_2O_5$ ratio between about 1.03 and about 1.12; and recovering said blend of sodium trimetaphosphate and sodium tripolyphosphate containing less than about 0.5 weight percent of water insoluble metaphosphates.

2. A process for manufacturing a blend consisting essentially of sodium trimetaphosphate and sodium tripolyphosphate; said mixture containing from about 7 to about 22 weight percent of sodium trimetaphosphate and less than about 0.5 weight percent of water insoluble metaphosphates; which process comprises calcining for at least about 15 minutes at a temperature between about 450° C. and about 550° C. a mixture of orthophosphate salts selected from the group consisting of dibasic sodium

| Phosphate Salt Mixture | $Na_2O/P_2O_5$ Ratio | Percent IMP In Product* | Conversion Time (at 500° C.), hours |
|---|---|---|---|
| Monosodium orthophosphate (conventional-control) | 1.00 | 1.29 | 1 |
| Monosodium orthophosphate+disodium orthophosphate | 1.05 | 0.95 | 1 |
| Monosodium orthophosphate+disodium orthophosphate | 1.075 | 0.04 | 1 |
| Monosodium orthophosphate+disodium orthophosphate | 1.10 | 0.39 | 1 |
| Monosodium orthophosphate+disodium orthophosphate | 1.12 | 1.20 | 1 |
| Monosodium orthophosphate+sodium tripolyphosphate | 1.12 | 0.25 | 1 |
| Monosodium orthophosphate (conventional-control) | 1.00 | 1.00 | 10 |
| Monosodium orthophosphate+disodium orthophosphate | 1.05 | 0.20 | 10 |
| Monosodium orthophosphate+disodium orthophosphate | 1.075 | nil | 10 |
| Sodium acid pyrophosphate+disodium orthophosphate | 1.10 | 0.10 | 10 |

*Calcined at 500° C.

These runs are made by first dissolving the "raw" phosphate materials in water, and then drum-drying and calcining in the same manner described in Example I.

It can be seen from the data in the foregoing table that whereas, via the utilization of the conventional $Na_2O/P_2O_5$ ratio of 1.0 about 10 hours at 500° C. are required to manufacture (calcine) a sodium trimetaphosphate product that contains about 1% IMP, it is possible, by practicing the present invention, to manufacture soorthophosphate, monobasic sodium orthophosphate, and the double salt of monobasic and dibasic sodium orthophosphate, and thereafter recovering said blend of sodium trimetaphosphate and sodium tripolyphosphate containing less than about 0.5 weight percent of water insoluble metaphosphates; the ratio of $Na_2O/P_2O_5$ in said mixture of orthophosphate salts being between about 1.05 and about 1.10.

3. A process for manufacturing a blend of sodium trimetaphosphate and sodium tripolyphosphate which contains about 13 weight percent of sodium tripolyphosphate and is substantially free of water insoluble metaphosphates, which process comprises calcining for at least about 15 minutes at a temperature between about 450° C. and about 550° C. a mixture of sodium orthophosphate salts selected from the group consisting of dibasic monosodium orthophosphate, monobasic sodium orthophosphate and the double salt of monobasic and dibasic sodium orthophosphates, and thereafter recovering said blend of sodium trimetaphosphate and sodium tripolyphosphate; the ratio of $Na_2O/P_2O_5$ in said mixture being about 1.075.

References Cited by the Examiner

UNITED STATES PATENTS

| | | | |
|---|---|---|---|
| 502,424 | 8/1893 | Precht | 23—106 |
| 2,055,332 | 9/1936 | Bryan | 23—106 |
| 2,358,965 | 9/1944 | Durgin et al. | 23—106 |
| 2,986,449 | 5/1961 | Rodis et al. | 23—106 |

FOREIGN PATENTS

| | | |
|---|---|---|
| 629,349 | 10/1961 | Canada. |
| 1,050,737 | 2/1959 | Germany. |

MAURICE A. BRINDISI, *Primary Examiner.*